(12) United States Patent
Rothman et al.

(10) Patent No.: US 9,891,929 B2
(45) Date of Patent: Feb. 13, 2018

(54) SYSTEM AND METHOD FOR REDIRECTING INPUT/OUTPUT (I/O) SEQUENCES

(71) Applicant: Intel Corporation, Santa Clara, CA (US)

(72) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 14/478,611

(22) Filed: Sep. 5, 2014

(65) Prior Publication Data

US 2014/0380034 A1 Dec. 25, 2014

Related U.S. Application Data

(63) Continuation of application No. 11/094,234, filed on Mar. 31, 2005, now Pat. No. 8,862,785.

(51) Int. Cl.
| | |
|---|---|
| *G06F 3/00* | (2006.01) |
| *G06F 9/44* | (2006.01) |
| *G06F 13/12* | (2006.01) |
| *G06F 13/40* | (2006.01) |

(Continued)

(52) U.S. Cl.
CPC .......... *G06F 9/4416* (2013.01); *G06F 3/0626* (2013.01); *G06F 3/0632* (2013.01); *G06F 3/0658* (2013.01); *G06F 3/0659* (2013.01); *G06F 3/0683* (2013.01); *G06F 13/128* (2013.01); *G06F 13/4004* (2013.01); *G06F 21/572* (2013.01); *G06F 3/061* (2013.01); *G06F 2221/03* (2013.01)

(58) Field of Classification Search
None
See application file for complete search history.

(56) References Cited

U.S. PATENT DOCUMENTS

| | | | |
|---|---|---|---|
| 5,548,783 A * | 8/1996 | Jones | G06F 3/0601 703/24 |
| 7,792,918 B2 * | 9/2010 | Corry | G06F 3/0604 709/216 |

(Continued)

OTHER PUBLICATIONS

Non-Final Office Action received for U.S. Appl. No. 11/094,234, dated Aug. 5, 2008, 12 pages.

(Continued)

*Primary Examiner* — Henry Tsai
*Assistant Examiner* — Aurangzeb Hassan
(74) *Attorney, Agent, or Firm* — Christopher K. Gagne

(57) ABSTRACT

A method for redirecting I/O (Input/Output) sequences. A computer platform is initialized. If the computer platform is enabled for command packet rerouting, the platform firmware may be used to install a runtime enable block I/O interface and a standard UNDI (Universal Network Device Interface) interface for routing I/O requests to a network controller or an out-of-band processor may be used to route I/O requests to a network interface controller. The routing of the I/O requests to the network controller or network interface controller enables the computer platform to boot from a remote block I/O storage device.

17 Claims, 3 Drawing Sheets

(51) Int. Cl.
*G06F 21/57* (2013.01)
*G06F 3/06* (2006.01)

(56) References Cited

U.S. PATENT DOCUMENTS

| | | | | |
|---|---|---|---|---|
| 8,578,126 | B1* | 11/2013 | Gaonkar | G06F 3/061 |
| | | | | 711/201 |
| 2002/0012347 | A1 | 1/2002 | Fitzpatrick | |
| 2003/0028807 | A1* | 2/2003 | Lawman | G11B 20/00086 |
| | | | | 726/4 |
| 2004/0186898 | A1* | 9/2004 | Kimura | G06F 3/0613 |
| | | | | 709/213 |
| 2005/0149716 | A1 | 7/2005 | Nair et al. | |
| 2005/0240855 | A1 | 10/2005 | Tseng et al. | |
| 2006/0146814 | A1 | 7/2006 | Shah et al. | |
| 2006/0149860 | A1 | 7/2006 | Diamant | |
| 2006/0179294 | A1* | 8/2006 | Chu | G06F 9/4405 |
| | | | | 713/2 |
| 2010/0088296 | A1* | 4/2010 | Periyagaram | G06F 3/061 |
| | | | | 707/705 |
| 2012/0297134 | A1* | 11/2012 | Parthasarathy | G06F 3/061 |
| | | | | 711/114 |

OTHER PUBLICATIONS

Non-Final Office Action received for U.S. Appl. No. 11/094,234, dated Dec. 22, 2009, 11 pages.
Non-Final Office Action received for U.S. Appl. No. 11/094,234, dated Oct. 5, 2010, 14 pages.
Non-Final Office Action received for U.S. Appl. No. 11/094,234, dated Oct. 28, 2013, 14 pages.
Non-Final Office Action received for U.S. Appl. No. 11/094,234, dated Sep. 11, 2013, 12 pages.
Notice of Allowance received for U.S. Appl. No. 11/094,234, dated Jul. 28, 2014, 12 pages.
Final Office Action received for U.S. Appl. No. 13/631,352, dated Apr. 15, 2009, 11 pages.
Final Office Action received for U.S. Appl. No. 13/631,352, dated Jun. 21, 2012, 12 pages.
Final Office Action received for U.S. Appl. No. 13/631,352, dated Jun. 25, 2010, 12 pages.
Final Office Action received for U.S. Appl. No. 13/631,352, dated May 11, 2011, 15 pages.
Response to Final Office Action received for U.S. Appl. No. 13/631,352, filed on Aug. 17, 2009, 16 pages.
Response to Final Office Action received for U.S. Appl. No. 13/631,352, filed on Jul. 12, 2013, 12 pages.
Response to Final Office Action received for U.S. Appl. No. 13/631,352, filed on Oct. 11, 2011, 14 pages.
Response to Final Office Action received for U.S. Appl. No. 13/631,352, filed on Sep. 13, 2010, 16 pages.
Response to Non-Final Office Action received for U.S. Appl. No. 13/631,352, filed on Apr. 30, 2012, 15 pages.
Response to Non-Final Office Action received for U.S. Appl. No. 13/631,352, filed on Feb. 5, 2009, 15 pages.
Response to Non-Final Office Action received for U.S. Appl. No. 13/631,352, filed on Feb. 7, 2011, 17 pages.
Response to Non-Final Office Action received for U.S. Appl. No. 13/631,352, filed on Mar. 11, 2014, 17 pages.
Response to Non-Final Office Action received for U.S. Appl. No. 13/631,352, filed on Mar. 22, 2010, 15 pages.

* cited by examiner

SYSTEM AND METHOD FOR REDIRECTING INPUT/OUTPUT (I/O) SEQUENCES

CROSS-REFERENCE TO RELATED APPLICATIONS

This application is a continuation of prior co-pending U.S. patent application Ser. No. 11/094,234, filed Mar. 31, 2005, which prior U.S. Patent Application is hereby incorporated herein by reference in its entirety.

BACKGROUND OF THE INVENTION

Field of the Invention

The present invention is generally related to remote storage devices. More particularly, the present invention is related to systems and methods for redirecting I/O sequences to enable block-level I/O to be sent to remote storage devices during pre-boot.

Description

Computer systems may access remote storage devices via network drives using network file abstraction. Network file abstraction is analogous to mounting one's P: drive that is maintained by IT (Information Technology). The operating system (O/S) of the computer system is familiar with the remote storage device and basically layers a network file system on top of the remote storage device. Access to the remote storage device consists of proxying file system type commands across the network, such as, for example, high level commands such as read the file, write to the file, delete the file, etc. A remote server will receive the commands and proxy the commands for the computer system. Network file abstraction does not allow direct access to file sectors.

Another means of communication between computer systems and remote storage devices utilizes a SCSI (Small Computer Systems Interface) protocol. With the movement of system interconnects from classical bus structures to network structures, IP (Internet Protocol) network structures are more and more becoming good candidates for carrying SCSI. Although the SCSI protocol has been mapped over various transports, such as IPI (Internet Protocol Interface), parallel SCSI, IEEE-1394 (firewire), Fibre Channel, etc., these transports are I/O specific and have limited distance requirements.

Internet Small Computer Systems Interface or iSCSI is an IP-based standard for linking data storage devices over a network and transferring data by carrying SCSI commands over IP networks. iSCSI data storage devices are treated as block level abstractions. Block level abstractions simulate a local drive with interactions that are block-based. Using command descriptor blocks that enable direct access to sectors, a controller receives these command packets that may, for example, require reading a certain sector, writing to a certain sector, formatting a sector or set of sectors, performing a check disk, etc. To date, block level abstractions have been limited to the O/S-runtime phase of a platform because they require O/S drivers. Thus, when an O/S is up and running, the computer system may attach to a remote iSCSI device and perform block-based I/O through an Internet Protocol (IP) using O/S driver assistance. However, during the pre-O/S phase of the computer system, remote block level devices are not mounted or visible to the computer platform, therefore block-based I/O through IP (i.e., iSCSI) cannot be performed. Thus, these remote block level devices are not usable as boot devices because no pre-boot mechanism currently exists for transmitting the SCSI packets to the remote block level devices during pre-boot.

Thus, what is needed is a system and method for allowing pre-operating system (pre-O/S) access to these block level I/O remote storage devices, such as, for example, iSCSI devices. What is also needed is a system and method for allowing pre-O/S access to these block level I/O remote devices to enable a platform to boot from these devices in a similar manner as locally connected devices.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to systems and methods for routing I/O sequences. Embodiments of the present invention provide the ability to remote block level access to devices which were previously only able to be accessed through advanced O/S driver support. The routing of I/O sequences enables the performance of block-based I/O through IP (e.g., iSCSI) during the pre-O/S phase of the computer system. In one embodiment, this may be accomplished using EFI (Extensible Firmware Interface)/platform firmware to facilitate the routing of I/O through block and UNDI (Universal Network Device Interface)

abstractions. In another embodiment, this may be accomplished using an out-of-band (OOB) microcontroller having OOB network connections.

With the advent of recent silicon advances that contain OOB network connections and platform firmware that contain the capability of easily mounting network and block abstractions that are non-standard, remote block devices may now be available for a myriad of usages that previously were not envisioned. For example, by enabling pre-O/S access to remote storage devices that consume block device directives, such as, for example, iSCSI, a platform may now boot from these remote storage devices in a similar fashion as locally connected devices. The ability to route block level abstractions using such protocols as iSCSI or the like may, for example, allow a home-PC to remote boot to a server in a different state, country, or continent.

Figure 1:
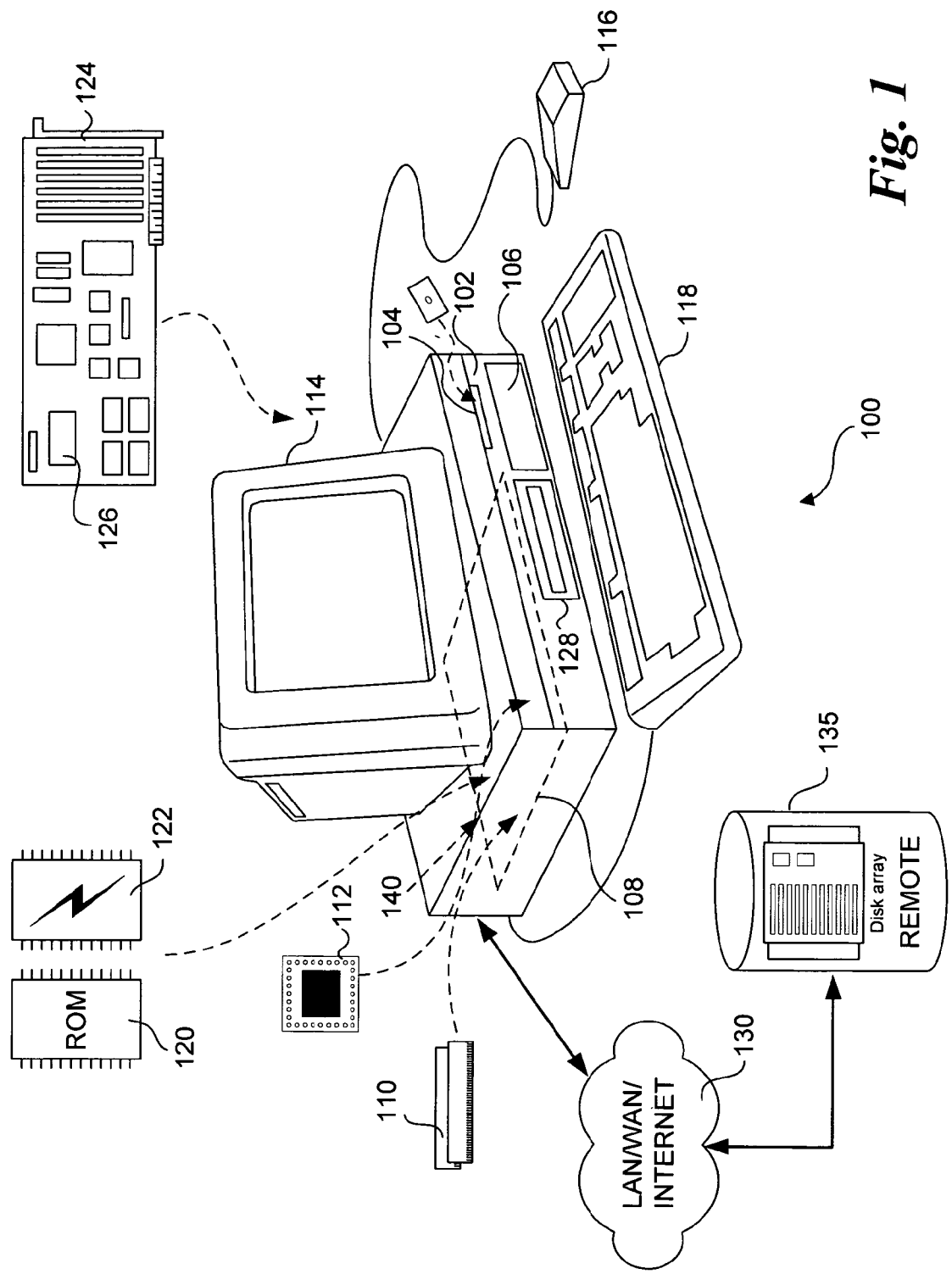
FIG. 1 is a block diagram illustrating an exemplary computer system having firmware stored in memory for implementing an embodiment of the present invention.

FIG. 1 is a block diagram illustrating an exemplary computer system 100 having firmware stored in memory for implementing an embodiment of the present invention. Computer system 100 may include various types of computer devices, including any computational device known in the art, such as a personal computer, a workstation, a server, a mainframe, a hand-held computer, a palm top computer, a personal digital assistant (PDA), a telephony device, a network appliance, a convergence device, etc. For simplicity, only the basic components of the computer system are discussed herein.

Computer system 100 includes a processor chassis 102, which houses various hardware components, including a floppy disk drive 104, a hard disk 106, a power supply (not shown), and a motherboard 108. Motherboard 108 is populated with appropriate integrated circuits, including system memory 110 coupled to one or more processors 112. System memory 110 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or a similar component. Processor 112 may be any type of processor capable of executing software, such as, for example, a microprocessor. Example microprocessors include, but are not limited to, an Intel Corporation x86, Pentium, Itanium, or any other Intel Corporation family microprocessor, a Motorola family microprocessor, etc. In general, processor 112 may comprise 32- or 64-bit architectures, and system memory 110 may include physical addressing schemes appropriate for processor 112, and may be accessed via corresponding address and data buses to which processor 112 and system memory 110 are connected.

Hard disk 106 may comprise a single unit or multiple units. In one embodiment, hard disk 106 may optionally reside outside of computer system 100.

Computer system 100 also includes a boot firmware device on which firmware is stored, which may typically comprise non-volatile memory, such as a ROM (Read-Only Memory) device 120 or a flash device 122. Other non-volatile memory devices include, but are not limited to, an Erasable Programmable Read Only Memory (EPROM), an Electronically Erasable Programmable Read Only Memory (EEPROM), or a similar type of memory. Motherboard 108 may include other firmware devices as well (not shown). In fact, in embodiments of the present invention, motherboard 108 may include a runtime firmware driver on the onboard processor (processor 112) to accept block access commands for enabling the performance of block-based I/O through IP during the pre-O/S phase of computer system 100.

A monitor 114 may be included for displaying graphics and text generated by firmware, software programs, and program modules that are run by computer system 100, such as, for example, system information presented during system boot (local or remote boot operations). A mouse 116 (or other pointing device) may be connected to a serial port, USB (Universal Serial Bus) port, or other bus port communicatively coupled to processor 112. A keyboard 118 may be communicatively coupled to motherboard 108 in a similar manner as mouse 116 for user entry of text and commands.

In one embodiment, computer system 100 also includes a network interface card (NIC), network controller card, or built-in NIC interface 140 for connecting computer system 100 to a communication network 130. Computer system 100 may connect to communication network 130 using any one of several types of data transmission media. Data transmission media may include, for example, twisted wire pair cabling, coaxial cabling, fiber optic cabling, etc. Alternatively, NIC 140 may be coupled to communication network 130 via a wireless data link. However, these are merely examples of data transmission media that may be used to transmit data between communication network 130 and computer system 100, and embodiments of the present invention are not limited in this respect.

Computer system 100 may also include add-in cards, such as add-in card 124. Add-in card 124 may be coupled to an expansion slot of motherboard 108. In one embodiment, add-in cards may include, but are not limited to, a disk controller, a network controller, or the like. In one embodiment, add-in card 124 may include an optional ROM 126 on which firmware is stored.

Computer system 100 may also optionally include a compact disk read only memory (CD-ROM) drive 128 into which a CD ROM disk may be inserted so that executable files and data on the disk may be read or transferred into system memory 110 and/or hard disk 106.

Other mass memory storage devices may be included in computer system 100 or reside outside of computer system 100 for use by computer system 100. For example, in one embodiment of the present invention, network 130 is further coupled to a remote storage array 135. In this instance, computer system 100 may communicate with remote storage array 135 via NIC 140 or an add-on card 124 comprising a network controller. In one embodiment, remote storage array 135 may be an I/O block level remote storage array, such as, for example, an iSCSI remote storage array, and at least one add-on card 124 may comprise a disk controller, such as an iSCSI disk controller, for controlling remote storage array 135. In another embodiment, remote storage array 110 may be another type of storage array capable of handling block level I/O.

A firmware device in computer system 100 may include firmware for performing the operations of the present invention. For example, a firmware interface infrastructure, such as, for example, an Extensible Firmware Interface (EFI), has the ability to talk across the network. The firmware may use the onboard processor (processor 112) to talk directly with NIC 140 (or a network controller add-on card 124) to route I/O block level requests or command descriptor blocks (CDBs) to remote storage array 135. CDBs are data structures that contain command parameters for block I/O devices, such as, for example, iSCSI devices.

Figure 2:
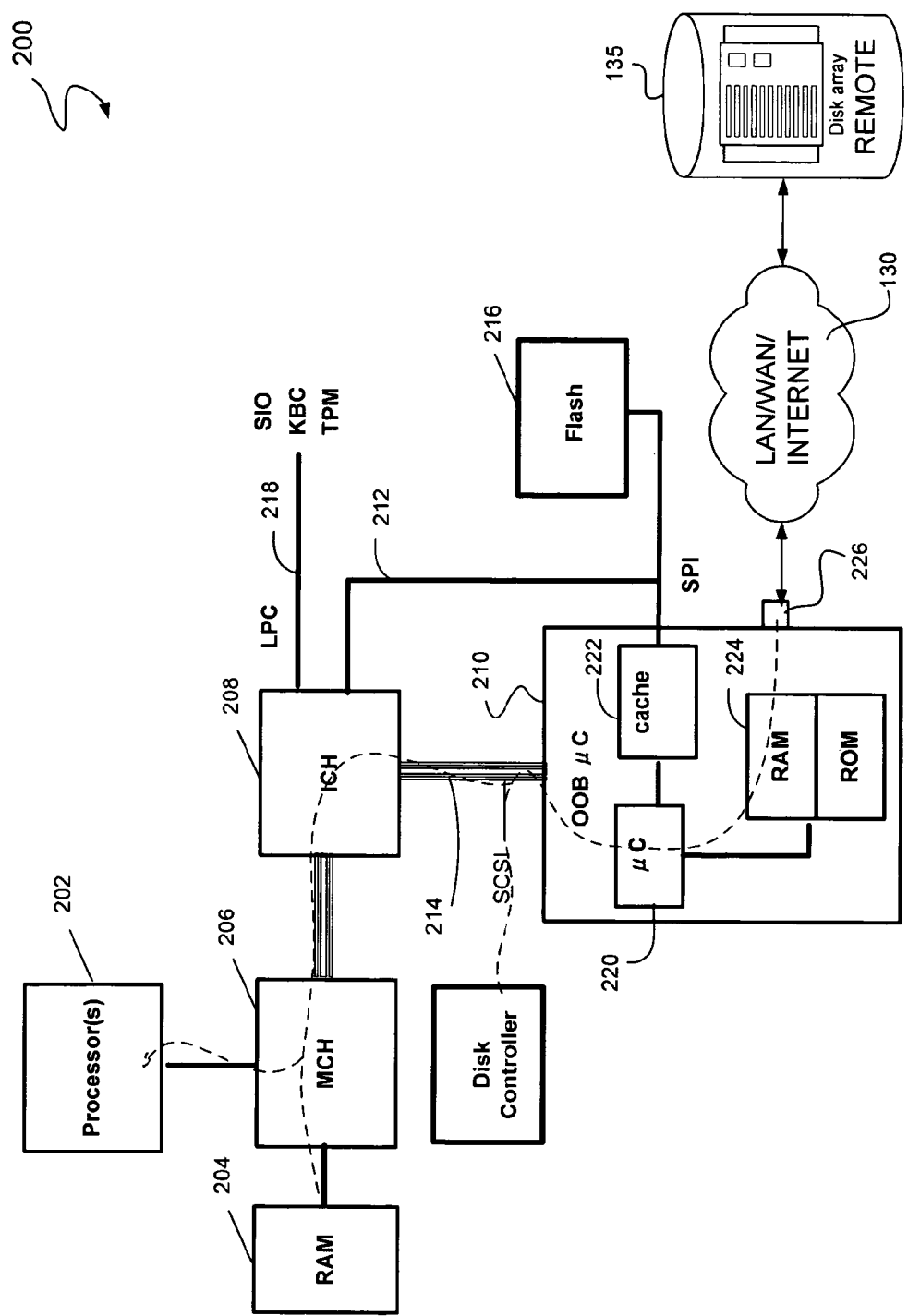
FIG. 2 is a block diagram illustrating an exemplary computer system having an out-of-band microcontroller for implementing an embodiment of the present invention.

FIG. 2 is a block diagram illustrating an exemplary computer system 200 having an out-of-band microcontroller for implementing an embodiment of the present invention. Computer system 200 comprises a processor 202, which may be referred to as an in-band processor. Processor 202 may connect to a system memory 204 via a memory controller hub (MCH) 206. Processor 202 may be any type of processor capable of executing software, such as, for example, a microprocessor, digital signal processor, microcontroller, or the like. Although FIG. 2 shows a single processor 202, in embodiments, there may be one or more in-band processors included in computer system 200. The one or more in-band processors may include multiple threads, multiple cores, or the like.

Processor 202 may be connected to I/O devices via an input/output controller hub (ICH) 208. ICH 208 may be coupled to various I/O devices, such as, for example, a super I/O controller (SIO), a keyboard controller (KBC), or a trusted platform module (TPM) via a low pin count (LPC) bus 218. The SIO may have access to floppy drives or industry standard architecture (ISA) devices. In an embodiment, ICH 208 may be coupled to a non-volatile memory 216 via serial peripheral interface (SPI) bus 212. Although shown in FIG. 2 as a flash memory, non-volatile memory 216 may be, but is not limited to, flash memory, static random access memory (SRAM), or the like.

An out-of-band (OOB) microcontroller 210 may be coupled to ICH 208 via a peripheral component interconnect (PCI) or PCI express bus 214. OOB microcontroller 210 may also be coupled to non-volatile memory 216 via SPI bus 212. OOB microcontroller 210 comprises a processor 220 which may be operatively coupled to a cache memory 222 as well as RAM and ROM memory 224. OOB microcontroller 210 may have an independent connection to a power supply (not shown) to enable out-of-band communications even when in-band processor 202 is not active. OOB microcontroller 210 may have a built-in network interface to enable out-of-band communications with I/O block devices, such as storage device 135 coupled to network 130. OOB microcontroller 210 may also include an SCSI disk controller for controlling remote storage device 135. With the use of OOB microcontroller 210 to route block level commands across network 130 to remote storage device 135, storage device 135 may be made to look like a local device, thus enabling OOB microcontroller to boot directly off remote storage device 135.

Figure 3:
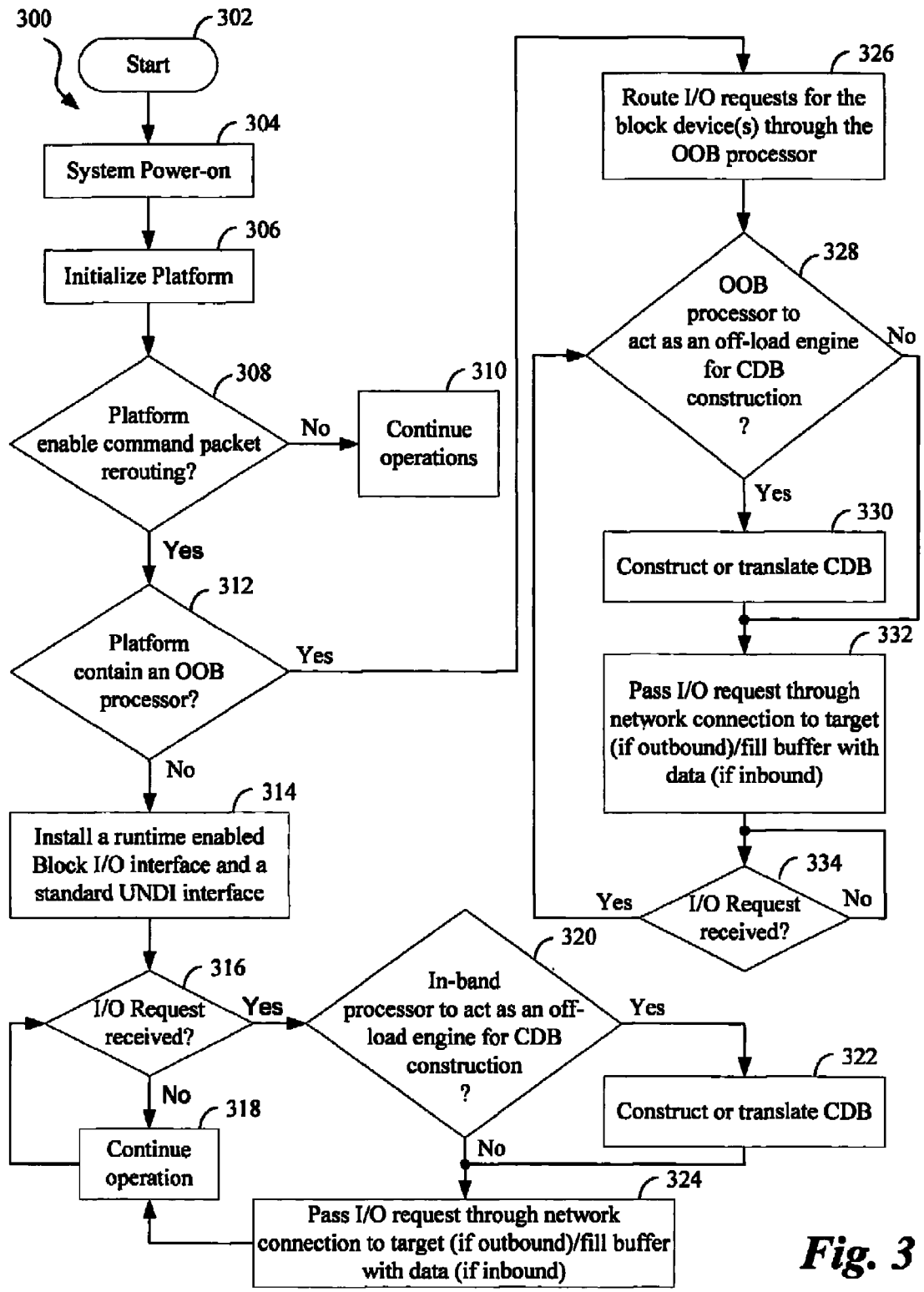
FIG. 3 is a flow diagram describing a method for redirecting I/O sequences according to an embodiment of the present invention.

FIG. 3 is a flow diagram describing a method for redirecting I/O sequences according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, the computer system is powered on. The process then proceeds to block 306, where the platform is initialized.

In decision block 308, it is determined whether the platform enables command packet rerouting. Command packet rerouting is enabled if firmware exists to provide such a capability or if an OOB processor is present to provide the capability. If it is determined that the platform does not enable command packet rerouting, then the process proceeds to block 310, where the system continues operations as usual.

Returning to decision block 308, if it is determined that the platform does enable command packet rerouting, then the process proceeds to decision block 312. In decision block 312, it is determined whether the platform contains an out-of-band microcontroller. If the platform does not contain an out-of-band microcontroller, then firmware will be used to enable command packet rerouting. The process then proceeds to block 314.

In block 314, a runtime enabled block I/O interface is installed. A standard UNDI interface is installed as well. The block I/O interface and the UNDI interface enable the routing of I/O requests to NIC 140. The process then proceeds to decision block 316.

In decision block 316, it is determined whether an I/O request has been received. If an I/O request has not been received, the process proceeds to block 318, where the system continues operating. The process then proceeds back to decision block 316 to determine whether an I/O request has been received.

In decision block 316, if it is determined that an I/O request has been received, the process then proceeds to decision block 320. In decision block 320, it is determined whether the on-board processor is required to act as an off-load engine for the construction of CDBs. In other words, it is determined whether the on-board processor must construct the CDBs. Instances where the on-board processor may not have to act as an off-load engine for construction of CDBs include the computer having a local SCSI controller or a driver to construct the CDBs. If the on-board processor does have to act as an off-load engine for the construction of CDBs, the process proceeds to block 322.

In block 322, the CDB(s) is constructed for out-bound communication by the on-board processor. If the communication is inbound, then the CDB is translated by the on-board processor. The process then proceeds to block 324.

Returning to decision block 320, if it is determined that the on-board processor does not have to act as an off-load engine for CDB construction, then a local SCSI controller, driver, or the like has either constructed or translated the CDB(s), and the process proceeds to block 324.

In block 324, the I/O request is passed through the network connection to the target device (i.e., block I/O device) if the request is an outbound request. If the request is an inbound request, a memory buffer is filled with data from the CDB sent from the target device. The process then proceeds to block 318, where the system continues to operate until another I/O request is received.

Returning to decision block 312, if it is determined that the platform does contain an out-of-band microcontroller, then the out-of-band microcontroller will be used to enable command packet rerouting. The process then proceeds to block 326.

In block 326, I/O requests for the remote block device(s) are routed through the out-of-band microcontroller. In decision block 328, it is determined whether the out-of-band microcontroller needs to act as an off-load engine for CDB construction. In other words, it is determined whether the out-of-band microcontroller must construct the CDB or whether a CDB has been sent to the OOB microcontroller. Instances where the OOB microcontroller may not have to act as an off-load engine include the OOB microcontroller having a SCSI disk controller or driver to perform CDB construction/translation. If a CDB has not been directly sent to the OOB microcontroller, then the out-of-band microcontroller may act as an off-load engine for CDB construction, and the process then proceeds to block 330.

In block 330, the CDB(s) is constructed for out-bound communication by the OOB microcontroller. If the communication is inbound, then the CDB is translated by the OOB microcontroller. The process then proceeds to block 332.

Returning to decision block 328, if the out-of-band microcontroller does not have to act as an off-load engine for CDB construction, then the out-of-band microcontroller does not have to construct or translate the CDB, and the process proceeds to block 332.

In block 332, the I/O request (namely, the CDB (command descriptor block) packet) is passed through the network connection to the target device (i.e., block I/O device) if the request is an outbound request. If the request is an inbound request/response, a memory buffer is filled with data pulled from the CDB. The process then proceeds to decision block 334.

In decision block 334, it is determined whether an I/O request has been received. If an I/O request has not been received, the process remains at decision block 334 awaiting an I/O request. If an I/O request has been received, the process proceeds back to decision block 328 to perform the process of rerouting another I/O request.

Embodiments of the present invention may be implemented using hardware, software, or a combination thereof and may be implemented in one or more computer systems, as shown in FIGS. 1 and 2, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. An apparatus comprising:
a device comprising:
multiple processors that include multiple cores;
a Trusted Platform Module; and
a Peripheral Component Interconnect Express interface capable of coupling a controller to the processors;
the controller, when coupled to the processors and when the device is in operation, being to:
act as an offload engine to generate, instead of the multiple processors, Internet Small Computer Systems Interface (iSCSI) protocol communication command descriptor blocks for iSCSI protocol communication with remote storage via a network; and
access the remote storage using the iSCSI protocol communication to obtain boot instructions from the remote storage;
wherein:
in operation, the apparatus is capable of employing an extensible firmware interface that is capable, during a phase of the operation of the device that occurs prior to operating system boot of the device, of facilitating iSCSI block-based and Universal Network Device Interface-based communication with the remote storage to permit the boot instructions to be obtained from the remote storage; and
the apparatus includes an expansion slot to receive a card that comprises the controller.

2. The apparatus of claim 1, wherein:
the controller is an out-of-band microcontroller capable of being coupled to the processors via a chipset and the interface.

3. The apparatus of claim 1, wherein:
a server comprises the device.

4. An apparatus comprising:
a device comprising:
multiple processors that include multiple cores;
a Trusted Platform Module; and
a Peripheral Component Interconnect Express interface capable of coupling a controller to the processors;
the controller, when coupled to the processors and when the device is in operation, being to:
act as an offload engine to generate, instead of the multiple processors, Internet Small Computer Systems Interface (iSCSI) protocol communication command descriptor blocks for iSCSI protocol communication with remote storage via a network; and access the remote storage using the iSCSI protocol communication to obtain boot instructions from the remote storage:

wherein:
in operation, the apparatus is capable of employing an extensible firmware interface that is capable, during a phase of the operation of the device that occurs prior to operating system boot of the device, of facilitating iSCSI block-based and Universal Network Device Interface-based communication with the remote storage to permit the boot instructions to be obtained from the remote storage; and
the remote storage comprises at least one of:
a remote storage array;
an iSCSI remote storage array; and
a remote disk.

5. An apparatus comprising:
a controller that when in operation and when coupled to processors via a Peripheral Component Interconnect Express interface, is to:
act as an offload engine to generate, instead of the processors, Internet Small Computer Systems Interface (iSCSI) protocol communication command descriptor blocks for iSCSI protocol communication with remote storage via a network; and
access the remote storage using the iSCSI protocol communication to obtain boot instructions from the remote storage;

wherein:
in operation, the apparatus is capable of employing an extensible firmware interface that is capable, during a phase of operation of the apparatus that occurs prior to operating system boot of the apparatus, of facilitating iSCSI block-based and Universal Network Device Interface-based communication with the remote storage to permit the boot instructions to be obtained from the remote storage;
a card comprises the controller; and
the processors comprise multiple cores and are coupled to a Trusted Platform Module.

6. The apparatus of claim 5, wherein:
the controller is an out-of-band microcontroller capable of being coupled to the processors via a chipset and the interface.

7. The apparatus of claim 5, wherein:
the processors and the card are to be comprised in a server.

8. The apparatus of claim 5, wherein:
the remote storage comprises at least one of:
a remote storage array;
an iSCSI remote storage array; and
a remote disk.

9. Non-transitory machine accessible memory storing instructions that when executed by a machine results in performance of operations comprising:
permitting a controller, when coupled to processors of an apparatus via a Peripheral Component Interconnect Express interface, to:
act as an offload engine to generate, instead of the processors, Internet Small Computer Systems Interface (iSCSI) protocol communication command descriptor blocks for iSCSI protocol communication with remote storage via a network; and
access the remote storage using the iSCSI protocol communication to obtain boot instructions from the remote storage;

wherein:
in operation, the apparatus is capable of employing an extensible firmware interface that is capable, during a phase of operation of the apparatus that occurs prior to operating system boot of the apparatus, of facilitating iSCSI block-based and Universal Network Device Interface-based communication with the remote storage to permit the boot instructions to be obtained from the remote storage;
a card comprises the controller; and
the processors comprise multiple cores and are coupled to a Trusted Platform Module.

10. The memory of claim 9, wherein:
the controller is an out-of-band microcontroller capable of being coupled to the processors via a chipset and the interface.

11. The memory of claim 9, wherein:
the processors and the card are to be comprised in a server.

12. The memory of claim 9, wherein:
the remote storage comprises at least one of:
a remote storage array;
an iSCSI remote storage array; and
a remote disk.

13. The memory of claim 9, wherein:
the machine accessible memory comprises firmware instructions.

14. A method comprising:
acting, by a controller, when the controller is coupled to processors of an apparatus via a Peripheral Component Interconnect Express interface, as an offload engine to generate, instead of the processors, Internet Small Computer Systems Interface (iSCSI) protocol communication command descriptor blocks for iSCSI protocol communication with remote storage via a network; and
accessing, by the controller, the remote storage using the iSCSI protocol communication to obtain boot instructions from the remote storage;

wherein:
in operation, the apparatus is capable of employing an extensible firmware interface that is capable, during a phase of operation of the apparatus that occurs prior to operating system boot of the apparatus, of facilitating iSCSI block-based and Universal Network Device Interface-based communication with the remote storage to permit the boot instructions to be obtained from the remote storage;
a card comprises the controller; and
the processors comprise multiple cores and are coupled to a Trusted Platform Module.

15. The method of claim 14, wherein:
the controller is an out-of-band microcontroller capable of being coupled to the processors via a chipset and the interface.

16. The method of claim 14, wherein:
the processors and the card are to be comprised in a server.

17. The method of claim 14, wherein:
the remote storage comprises at least one of:
a remote storage array;
an iSCSI remote storage array; and
a remote disk.

* * * * *